F. B. WARNER.
MULTIFOCAL TELESCOPE.
APPLICATION FILED OCT. 8, 1913.

1,088,494.

Patented Feb. 24, 1914.

WITNESSES
Edw. Thorpe
Geo. G. Hoskin

INVENTOR
Franklin B. Warner
BY Munn & Co
ATTORNEYS

UNITED STATES PATENT OFFICE.

FRANKLIN BROCKWAY WARNER, OF NEW YORK, N. Y., ASSIGNOR TO KIRTLAND BROS. & CO., OF NEW YORK, N. Y.

MULTIFOCAL TELESCOPE.

1,088,494.      Specification of Letters Patent.      Patented Feb. 24, 1914.

Application filed October 8, 1913. Serial No. 794,033.

*To all whom it may concern:*

Be it known that I, FRANKLIN B. WARNER, a citizen of the United States, and a resident of the city of New York, borough of Brooklyn, in the county of Kings and State of New York, have invented a new and Improved Multifocal Telescope, of which the following is a full, clear, and exact description.

The invention relates to telescopes having a tube made in telescoping sections to allow of extending or folding the sections.

The object of the invention is to provide a new and improved multi-focal telescope arranged to permit the convenient use of interchangeable objective lenses of more or less magnifying power and different focal length and to allow changing the length of the tube to correspond to the focal length of the objective, the tube sections being firmly held in the adjusted positions.

In order to accomplish the desired result use is made of a tube consisting of sections telescoping one in the other, the sections being tapering and made of a material capable of gradually contracting in drawing out the sections to hold the sections firmly in place on being drawn out more or less according to the focal length of the objective used at the time. Use is also made of lenses of different magnifying power and focal length and interchangeably held in the cell of the objective and a diaphragm held lengthwise adjustable in the tube of the terrestrial eyepiece.

A practical embodiment of the invention is represented in the accompanying drawings forming a part of this specification, in which similar characters of reference indicate corresponding parts in all the views.

Figure 1:
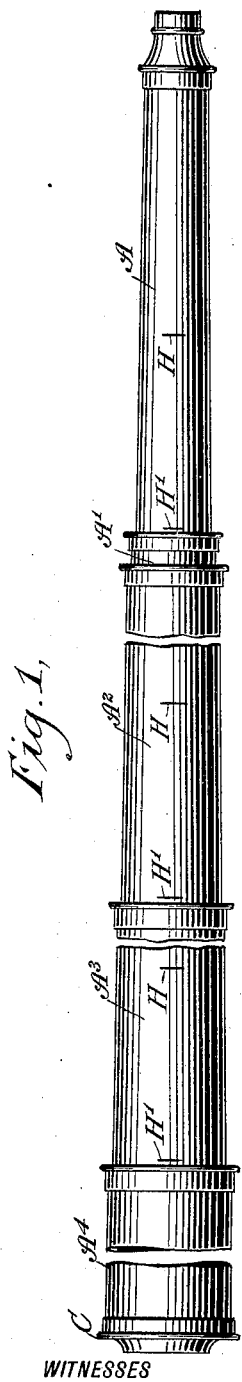
Figure 2:
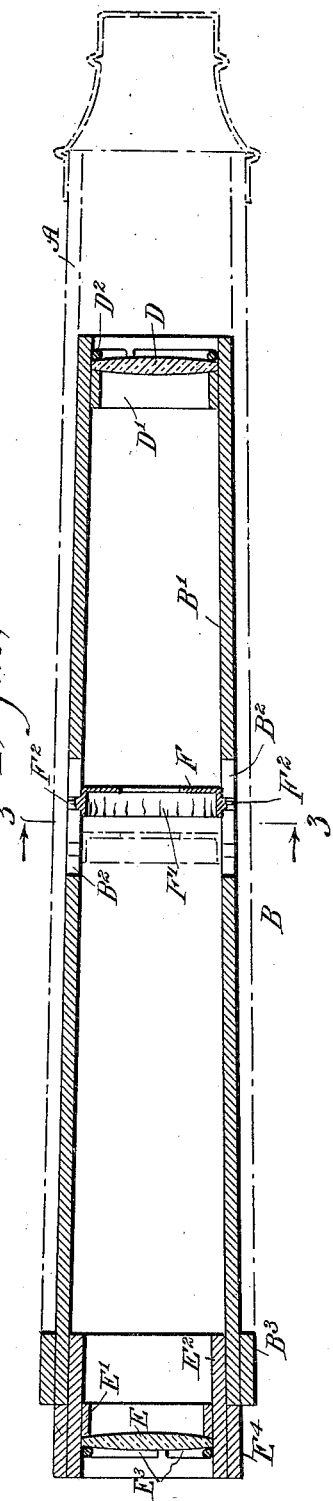
Figure 3:
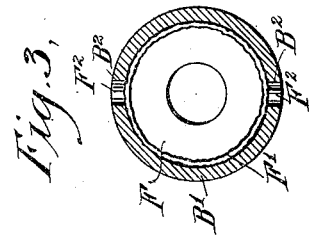
Figure 4:
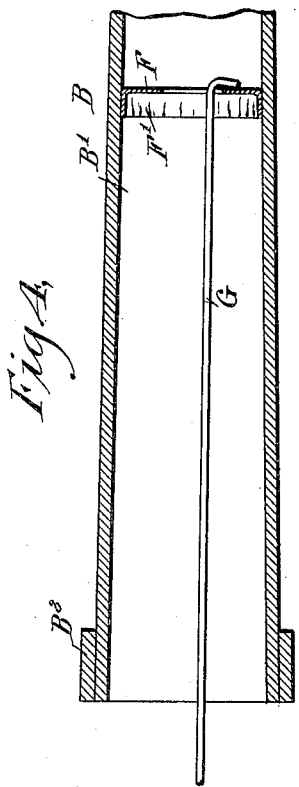
Figure 5:
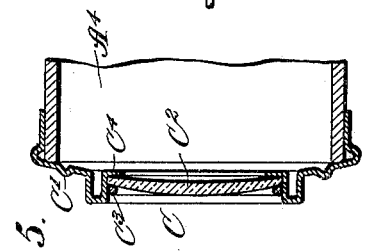

Figure 1 is a side elevation of the multifocal telescope with parts of the sections broken out; Fig. 2 is an enlarged longitudinal central section of the terrestrial eyepiece provided with an adjustable diaphragm; Fig. 3 is a cross section of the same on the line 3—3 of Fig. 2; Fig. 4 is a longitudinal central section of a modified form of the terrestrial eyepiece; and Fig. 5 is an enlarged longitudinal central section of the objective on the end of the outermost tube section.

The tube of the telescope is formed of a series of conical sections $A$, $A'$, $A^2$, $A^3$, and an end section $A^4$ of cylindrical shape, the sections telescoping one in the other, and the sections being made of stiff paper or similar material capable of gradually contracting on drawing out the sections to hold the sections firmly in place on being drawn out more or less. The first section $A$ is provided with a terrestrial eyepiece $B$ and the last section $A^4$ is provided at its outer end with an objective $C$ consisting of a cell $C'$ in which is removably held an objective $C^2$ by the use of a split ring $C^3$ engaging the outer face of the lens $C^2$ on pressing the same onto the annular seat $C^4$ formed on the cell $C'$, as plainly indicated in Fig. 5. By the arrangement described the lens $C^2$ can be readily removed and replaced by another of different magnifying power and focal length.

The terrestrial eyepiece $B$ is provided at its ends with the usual lenses $D$ and $E$, of which the lens $D$ is seated on a ring $D'$ held in the outer end of the tube $B'$ of the terrestrial eyepiece $B$, and the lens $D$ is held against the said ring by a split ring $D^2$ (see Fig. 2). The outer lens $E$ of the eyepiece $B$ is seated on a ring $E'$ held within a short tube $E^2$ removably fitted into the outer end of the tube $B'$, and the said lens $E$ is held against the ring $E'$ by a split ring $E^3$. The short tube $E^2$ is provided at the outside with a shoulder $E^4$ to limit the inward movement of the short tube $E^2$ in the outer end of the tube $B'$.

Intermediate the lenses $D$ and $E$ is arranged a diaphragm $F$ held lengthwise adjustable in the tube $B'$. For the purpose mentioned the diaphragm $F$ is provided with a flange $F'$ irregularly corrugated to render the flange sufficiently flexible with a view to bear against the inner wall of the tube $B$ to hold the diaphragm $F$ in the adjusted position. The flange $F'$ is provided with diametrically - disposed outwardly - extending lugs $F^2$ projecting into elongated slots $B^2$ formed in the tube $B'$ to permit the user of the telescope to take hold of the lugs $F^2$ with a view to push the diaphragm $F$ forward or backward in the tube $B'$ to adjust the diaphragm according to the focal length of the objective lens $C^2$ used at the time in the objective $C$. It is understood that for the purpose mentioned the tube $B'$ is drawn out of the tube section $A$ and after the desired adjustment has been made the tube $B'$ is replaced in the tube section $A$. The outer end of the tube $B'$ is provided with a collar $B^3$ adapted to abut against the outer end of the tube section A so as to hold the terrestrial eyepiece B in proper position in the tube section A.

In the modified form shown in Fig. 4 the diaphragm F is provided with the corrugated flange F' but the lugs F² are omitted, and in this case use is made of a hook G adapted to be passed into the tube B' from the outer end thereof after the tube E² and its lens E have been removed from the tube B'. The hook G serves to move the diaphragm F forward or backward in the tube B' to adjust the diaphragm F according to the focal length of the objective lens C² used at the time.

Each of the sections A, A', A² and A³ is provided with stop marks H, H', spaced suitable distances apart to permit the user of the telescope to draw out the sections A, A', A² and A³ the desired length according to the focal length of the objective lens C² used at the time. Thus if the focal length of the objective lens C² used at the time is say 24 inches then the sections A, A', A² and A³ are drawn out until the stop marks H register with the adjacent end of the next following section, it being understood that when the several sections have been drawn out as described the sections are in proper position for a lens C² of 24 inches focal length. In this case the diaphragm F is shifted outward to the position shown in dotted lines in Fig. 2. In case the objective lens C² is of 36 inches focal length then the several sections A, A', A² and A³ are drawn out until the stop marks H' register with the adjacent ends of the next following sections, the tube then being extended for a lens of 36 inches focal length. The diaphragm F in this case is shifted to the position shown in Fig. 2 so as to be in proper position in the eyepiece for an objective of 36 inches focal length.

From the foregoing it will be seen that by the arrangement described interchangeable objective lenses of more or less magnifying power and different focal length can be used in the telescope, a proper adjustment being made, however, of the diaphragm F in the eyepiece B. It will also be noticed that by making the sections A, A', A², A³ conical or slightly tapering and of a somewhat pliable material, it is evident that the sections can be drawn out either for the long or short focus at the same time, however, holding the sections firmly in the adjusted position.

It is understood that when a section is drawn out the paper material contracts or yields sufficiently to allow of drawing out the section to the desired distance, and the farther the section is drawn out the firmer it is held in the next following section in which it is snugly fitted to slide.

Having thus described my invention, I claim as new and desire to secure by Letters Patent:

1. A telescope, comprising a tube made in sections telescoping one in the other, the sections being tapering and made of a material capable of gradually contracting on drawing out the sections to hold the sections firmly in place on being drawn out more or less, a cell attached to the outer end of the last tube section, an objective lens held removable in the said cell, and a terrestrial eyepiece held in the first tube section and provided with a lengthwise adjustable diaphragm to permit of adjusting the diaphragm to objective lenses of different focal lengths.

2. A telescope, comprising a tube made in sections, a cell attached to the outer end of the last tube section, an objective lens held removable in the said cell, and a terrestrial eyepiece held in the first tube section and provided with a lengthwise adjustable diaphragm to permit of adjusting the diaphragm to objective lenses of different focal lengths.

3. A telescope, comprising a tube made in sections, a cell attached to the outer end of the last tube section, an objective lens held removable in the said cell, a terrestrial eyepiece held in the first tube section and provided with a lengthwise adjustable diaphragm to permit of adjusting the diaphragm to objective lenses of different focal lengths, and manually-controlled means for adjusting the said diaphragm.

4. A telescope, comprising a tube made in sections, a cell attached to the outer end of the last tube section, an objective lens held removable in the said cell, spaced stop marks on each of the said tube sections to permit of drawing out the sections for different focal lengths of the objective lens, and a terrestrial eyepiece held in the focal tube section and provided with a lengthwise adjustable diaphragm to permit of adjusting the diaphragm to objective lenses of different focal lengths.

In testimony whereof I have signed my name to this specification in the presence of two subscribing witnesses.

FRANKLIN BROCKWAY WARNER.

Witnesses:
G. R. PATCHEN,
GEO. W. BEHRENS.

---

Copies of this patent may be obtained for five cents each, by addressing the "Commissioner of Patents, Washington, D. C."